United States Patent Office 3,538,204
Patented Nov. 3, 1970

3,538,204
EMBOSSED EFFECTS ON RESINOUS COMPOSITIONS
David Lynn Grubb, Donaghadee, Northern Ireland, and Thomas J. Wiggins, Brynmawr, Wales, assignors to Dunlop Semtex Limited, London, England
No Drawing. Filed Dec. 12, 1966, Ser. No. 600,764
Claims priority, application Great Britain, Dec. 16, 1965, 53,541/65
Int. Cl. B29d 7/00
U.S. Cl. 264—54                  6 Claims This invention relates to a method of forming an embossed effect on the surface of a resinous composition and particularly to the use of colouring materials to give a coloured effect in conjunction with the embossed effect.

The invention provides a method of obtaining an embossed effect on the surface of an expanded thermoplastic resinous composition, in which a selected portion of an expansible resinous composition is treated to render it less thermoplastic, and the expansible composition is expanded whereby the surface of the portion of the composition that has not been so treated rises above the level of the surface of the treated portion to form an embossed effect. The "selected portion" can be comprised of one or more areas which can be of the same or different shapes and sizes, and accordingly a variety of embossed effects can be obtained.

The method of the invention is particularly applicable to forming an embossed effect on polymers or copolymers of vinyl chloride, and the invention is described below with particular reference to the formation of embossed effects on expanded polyvinyl chloride (P.V.C.) or vinyl copolymers. However, the method is applicable to other expansible polymers.

The treatment used to render the selected portion of the surface of the expansible resinous composition less thermoplastic, is conveniently by use of a fluid composition which can be applied to the surface by printing or other means to produce a surface layer in the resinous composition, if necessary using heat or other conditions to bring it into the desired condition of reduced thermoplasticity. For example, a liquid composition containing an unsaturated compound capable of being cross-linked can be used in conjunction with means to provide a sufficient degree of cross-linking in the compound to produce a relatively non-thermoplastic layer. Cross-linking can be obtained either by the influence of heat or radiation, or by incorporating in the composition a suitable cross-linking agent which will react with or polymerise the unsaturated compound, if necessary using heat.

Both embossed and coloured effects can be obtained using one form of the method of the invention and these two effects can either be complementary (that is, the coloured effect can be obtained in the depressions or valleys of the surface), or the coloured effect can be obtained on the embossed portion, or the coloured effect can be obtained on both the embossed and non-embossed portions. Where the coloured effect is required only on the portion of the surface not embossed, the necessary pigment or other colouring material can be conveniently applied in any fluid composition, for instance that used to produce the less thermoplastic layer. Looking at the matter another way, the ingredients providing the less thermoplastic layer can be incorporated in a suitable printing ink or other colouring material, and it is to the latter procedure that the present invention is particularly directed. This printing ink can contain a thermoplastic resinous polymer or copolymer. It has been found convenient to provide the less thermoplastic layer by using in the ink a plasticizer which is an unsaturated polyfunctional ester. Suitable plasticizers are the unsaturated esters sold by Anchor Chemical Company Limited under the trademark Sartomer. For example, suitable di- and poly-functional esters are:

Allyl methacrylate
Diallyl fumarate
Triethylene glycol dimethacrylate
Ethylene glycol dimethacrylate
Tetraethylene glycol dimethacrylate
1,3-butylene glycol dimethacrylate
Polyethylene glycol dimethacrylate
Trimethylol propane trimethacrylate These esters are clear, mobile, liquid monomers which can readily be polymerized by free-radical initiation. So called "mono-functional" esters such as tetrahydrofurfuryl methacrylate and cyclohexyl methacrylate can also be used because the active hydrogen on the tertiary carbon atom provides difunctionally and enable cross-linking to take place. Initiation can be obtained using peroxy initiators, for example tertiary butyl perbenzoate and methylethyl ketone peroxide.

Suitable printing inks for use in the method of this invention are, for instance, solutions of vinyl chloride-vinyl acetate copolymers. Such copolymers can contain a phthalate ester plasticizer, and the solution can be one in a solvent such as methylethyl ketone, cyclohexanone or tetrahydrofuran. Suitable inks are those conventionally used for printing plastized P.V.C. film, except that part or all of the conventional plasticizer is replaced by an unsaturated plasticizer which can also constitute part or all of the solvent. The ink can also contain a free-radical initiator.

Although this specification is not to be limited by any particular theory, it is believed that where the selected surface portion is treated with an unsaturated cross-linkable compound, the latter, when cross-linked, forms a relatively non-thermoplastic layer within the surface of the resinous composition, and that when the resinous composition is subjected to expanding conditions this comparatively rigid layer prevents, or at least limits, the expansion of the composition. Accordingly, in the expanded product the area of the less thermoplastic layer constitutes valleys or depressions and the other areas constitute the embossed portions.

Where a coloured effect is required in the embossed portion of the resinous composition, it can be obtained by application of a conventional printing ink or other suitable colouring materials, either to the embossed portion after the resinous composition has been expanded or to the corresponding portion before expansion has taken place. In the latter instance, the colouring material can be applied to the surface of the resinous composition either before, after, or concurrently with, the treatment of the selected portion of the surface with the means to provide the less thermoplastic layer.

Of course, even when the coloured effect is complementary to the embossed effect, it is not essential that the colouring material be applied at the same time as the means to produce the less thermoplastic layer. Separate application of colouring material and the means to produces the less thermoplastic layer would be appropriate, for instance, where the latter means is not in the form of a composition, but is a radiation-inducing production of free-radicals.

The invention also provides printing inks and like colouring materials for use on the surface of a heat-extensible resinous composition, which contains a substance which, after the colouring material has been applied to the surface of an expansible resinous composition forms, if necessary after the application of heat, a substantially non-thermoplastic layer. The printing ink can, for example, comprise a thermoplastic polymer or copolymer, a pigment, a plasticizer, an unsaturated cross-linkable compound, which can comprise part or all of the plasticizer, and cross-linking agent for said unsaturated compound, the whole being carried by a suitable liquid medium. Where heat is necessary to form the less thermoplastic layer, the blowing agent, unsaturated compound and cross-linking means should be chosen so that the formation of the said layer is substantially complete before the resinous composition is fully expanded by the blowing agent. The printed resinous composition can be pre-heated at a temperature below the blowing temperature of the blowing agent, so that the unsaturated plasticizer at least has time to diffuse into the resinous composition.

After application of the printing ink or other colouring material, a sealing agent can be applied, for instance a clear P.V.C. paste or a solution of P.V.C. or other thermoplasitc material. The sealing agent can be applied after expansion of the resin, in which case the agent can be of a cross-linking nature, for instance one containing a polyurethane or an unsaturated ester, such as a Sartomer, but this procedure requires an additional heating step and it is easier to apply a thermoplastic saturated sealing agent before expanding agent before expanding the resinous composition.

The invention is illustrated by the following examples in which all "parts" referred to are parts by weight:

EXAMPLE I

A printing ink of this invention was obtained as follows. First, the following ingredients were blended together:

| | Parts |
|---|---|
| Copolymer of vinyl chloride (85%) and vinyl acetate (15%) | 100 |
| Plasticizer—trimethylol propane trimethacrylate | 25 |
| Stabilizer—tin mercaptide | 1.5 |
| Cross-linking agent—tertiary butyl perbenzoate | 1.5 |
| | 128 |

40 parts of the blend thus obtained were dissolved in 200 parts by weight of a solvent that was a blend of the following ingredients:

| | Parts |
|---|---|
| Cyclohexanone | 40 |
| Methylisobutyl ketone | 80 |
| Xylene | 40 |
| | 160 |

EXAMPLE II

A second printing ink was prepared as described in Example I, except that 100 parts of a P.V.C. homopolymer was used instead of 100 parts of the copolymer, and that the amount of the plasticizer was 35 parts instead of 25.

EXAMPLE III

A further printing ink was prepared as described in Example I, except that there was used as cross-linking agent 1.5 parts of methylethyl ketone peroxide instead of the tertiary butyl perbenzoate.

EXAMPLE IV

Embossed P.V.C. sheets according to the invention were obtained using the printing ink of Example I, as follows.

A P.V.C. paste composition was obtained by blending together the following ingredients:

| | Parts |
|---|---|
| P.V.C. (K value=65) paste polymer | 100 |
| Plasticizer—dioctyl phthalate | 60 |
| Blowing agent—azodicarbonamide | 3 |
| Stabilizer—mixture of cadmium and zinc soaps | 2 |
| Pigments | 2 |

The blended composition was spread on flooring felt, for instance a sheet of reconstituted cellulose felt, to a thickness of about 0.02 inch, and the coated felt was then passed through an oven at 120° C. for 30 seconds to gel the P.V.C. composition. A pattern was then applied to the gelled layer using the printing ink of Examle I, and the coated felt was heated at 120° C. for 15 minutes to cause the cross-linkable Sartomer to diffuse into the gelled P.V.C. and partly cross-link. The coated felt was then heated at 220° C. for one minute which caused the blowing agent to expand the P.V.C. composition except over those portions of the surface which had been printed. These did not rise to the same extent, thereby resulting in an embossed effect being obtained on the surface of the P.V.C. composition, the printed portions of the surface constituting the "valleys" or depressions in the surface.

EXAMPLES V AND VI

Two further embossed P.V.C. sheets were obtained by repeating Example IV but using, respectively, the printing inks of Examples II and III. The results obtained were very similar to those of Example IV.

EXAMPLE VII

A printing ink of this invention was obtained by dissolving 10 parts of a P.V.C. homopolymer in 90 parts of the tetrahydrofurfuryl methacrylate sold under the tradename Sartomer SR 203 and mulling one part of pigment into the solution so obtained.

EXAMPLE VIII

A printing ink of this invention was obtained by dissolving 10 parts of a P.V.C. homopolymer in 90 parts of the ethylene glycol dimethacrylate sold under the tradename Sartomer SR 206 and mulling one part of pigment into the solution so obtained.

EXAMPLE IX

Example IV was repeated but using the printing ink of Example VII instead of the ink of Example I. A very similar result was obtained.

EXAMPLE X

Example IV was repeated but using the printing ink of Example VIII instead of the ink of Example I. A very similar result was obtained.

Having now described our invention, what we claim is:

1. A method of obtaining an expanded thermoplastic resinous material having an embossed effect on its surface, in which said resinous material is based on a polymer of vinyl chloride, which comprises applying to a selected portion of said resinous material in expansible form an unsaturated polymerizable ester of methacrylic acid and a peroxy cross-linking agent which will cross-link said ester on heating thereby reducing the thermoplasticity of said selected portion, and heating the treated material to cause it to expand whereby the surface of the portion of the material that has not been treated rises above the level of the surface of the treated portion to form an embossed effect.

2. A method according to claim 1, in which the ester is trimethylol propane trimethacrylate.

3. A method according to claim 1, in which the ester is tetrahydrofurfuryl methacrylate.

4. A method according to claim 1, in which the ester is ethylene glycol dimethacrylate.

5. A method according to claim 1, in which said ester is applied to said selected portion in a liquid printing ink.

6. A method according to claim 5, in which the liquid printing ink contains said cross-linking agent.

References Cited

UNITED STATES PATENTS

| | | | |
|---|---|---|---|
| 2,961,332 | 11/1960 | Nairn | 264—47 |
| 3,365,353 | 1/1968 | Witman | 264—54 |
| 3,399,106 | 8/1968 | Palmer et al. | 264—51 |

DONALD J. ARNOLD, Primary Examiner

L. GARRETT, Assistant Examiner

U.S. Cl. X.R.

264—46, 53